United States Patent [19]
Hong et al.

[11] Patent Number: 4,820,933
[45] Date of Patent: Apr. 11, 1989

[54] CONTROL CIRCUIT FOR LIQUID CRYSTAL REAR-VISION MIRROR

[75] Inventors: Suk-Kwon Hong, Suwon; Ho-Yol Bang, Inchon; Hyun-Jun Shin, Gwachon, all of Rep. of Korea

[73] Assignee: Samsung Electronics Co., Ltd., Suwon City, Rep. of Korea

[21] Appl. No.: 139,736

[22] Filed: Dec. 30, 1987

[30] Foreign Application Priority Data

Dec. 31, 1986 [KR] Rep. of Korea ............... 1986-11703

[51] Int. Cl.[4] ............................................. G02F 1/133
[52] U.S. Cl. ................................... 307/10.1; 350/279; 350/331 R
[58] Field of Search ............ 307/10 R, 310, 311; 350/242, 278, 279, 283, 330, 331 R, 331 T, 332, 333, 335, 336, 337, 338, 339, 347, 349, 357, 345, 486, 355, 637, 642, 632

[56] References Cited

U.S. PATENT DOCUMENTS

| | | | |
|---|---|---|---|
| 4,021,935 | 5/1977 | Witt | 350/331 R X |
| 4,152,846 | 5/1979 | Witt | 350/331 R X |
| 4,560,239 | 12/1985 | Katz | 350/331 R |
| 4,603,946 | 8/1986 | Kato et al. | 350/331 R |
| 4,620,322 | 11/1986 | Eggenschwiler et al. | 350/331 R |
| 4,632,509 | 12/1986 | Ohmi et al. | 350/338 X |
| 4,669,825 | 6/1987 | Itoh et al. | 350/338 X |
| 4,678,281 | 7/1987 | Bauer | 350/331 R |
| 4,690,508 | 9/1987 | Jacob | 350/331 R |
| 4,697,883 | 10/1987 | Suzuki et al. | 350/331 R |
| 4,701,022 | 10/1987 | Jacob | 350/279 X |

*Primary Examiner*—William M. Shoop, Jr.
*Assistant Examiner*—Paul Ip
*Attorney, Agent, or Firm*—Robert E. Bushnell

[57] ABSTRACT

A circuit for controlling a liquid crystal rear-vision mirror is disclosed. The liquid crystal rear-vision mirror is equipped in an automobile to sense the amount of lights incident upon the mirror itself from a headlight of another automobile following behind. When the level of incident lights goes higher than a pre-determined level, the circuit generates a pulse signal of a fixed period to make the liquid crystal shutter properly function so that the amount of said incident light reflecting from the mirror to the driver will be decreased to a level adequate to secure driving safety.

11 Claims, 6 Drawing Sheets

CONTROL CIRCUIT FOR LIQUID CRYSTAL REAR-VISION MIRROR

BACKGROUND OF THE INVENTION

1. Field of the Invention

The present invention relates to a control circuit for liquid crystal rear-vision mirror and particularly to a control circuit for operating the liquid crystal rear-vision mirror having one-dotted display device for use in an automobile.

2. General Description of the Prior Art

A liquid crystal display device includes two pieces of glass-substrate coated with transparent electrodes and a liquid crystal material filled up between the two substrates. On the liquid crystal display cell a desired pattern to display is etched and a voltage is fed to said transparent electrodes to operate a liquid crystal shutter, thereby making the pattern be displayed. There is required a liquid crystal driving circuit for feeding a predetermined voltage to the liquid crystal cell to make the etched pattern be displayed as desired.

As the liquid crystal cell now becomes widely used in the field, a liquid crystal rear-view mirror is now being introduced into the automobile. The mirror comprises a singly formed one-dotted liquid crystal display cell having a reflecting film made by aluminium evaporation. But it is almost impossible in the conventional liquid crystal driving circuit to make the one-dotted liquid crystal rear-vision mirror installed in an automobile operate to promote the convenience of a driver by controlling the liquid crystal shutter in response to the incident light.

3. Object of the Invention

Thus the main object of the present invention is to provide a control circuit for a liquid crystal rear-vision mirror for use in an automobile. It is another object to provide a control circuit capable of automatically operating the liquid crystal rear-vision mirror to prevent the incident light from being reflected toward the driver whenever the amount of light reaches beyond a fixed reference level.

The other object of the present invention is to provide a voltage driving circuit being capable of quickly operating the liquid crystal rear-vision mirror by buffering the driving voltage of the liquid crystal at a sufficiently high level.

SUMMARY OF THE INVENTION

The above stated objects of the invention are achieved in a control circuit for sensing the intensity of lights of the headlight coming from the auto following behind, generating a signal voltage in response to the intensity, comparing the voltage with a fixed reference voltage, providing a pulse signal of a fixed period from an oscillator whenever the signal voltage becomes higher than the reference voltage, converting the pulse signal output into a pair of driving pulses of different phase having a fixed period and amplitude and thereby driving the liquid crystal rear-vision mirror.

BRIEF DESCRIPTION OF THE DRAWINGS

These and other objects and advantages of the present invention will become clear from the following description with reference to the accompanying drawings, wherein:

FIGS. 1(A)(B)(C) are a schematic diagram showing the structure of the liquid crystal rear-vision mirror and plots showing the responsive characteristics of the liquid crystal in relation to voltages applied;

DETAILED DESCRIPTION OF THE INVENTION

Figure 1:
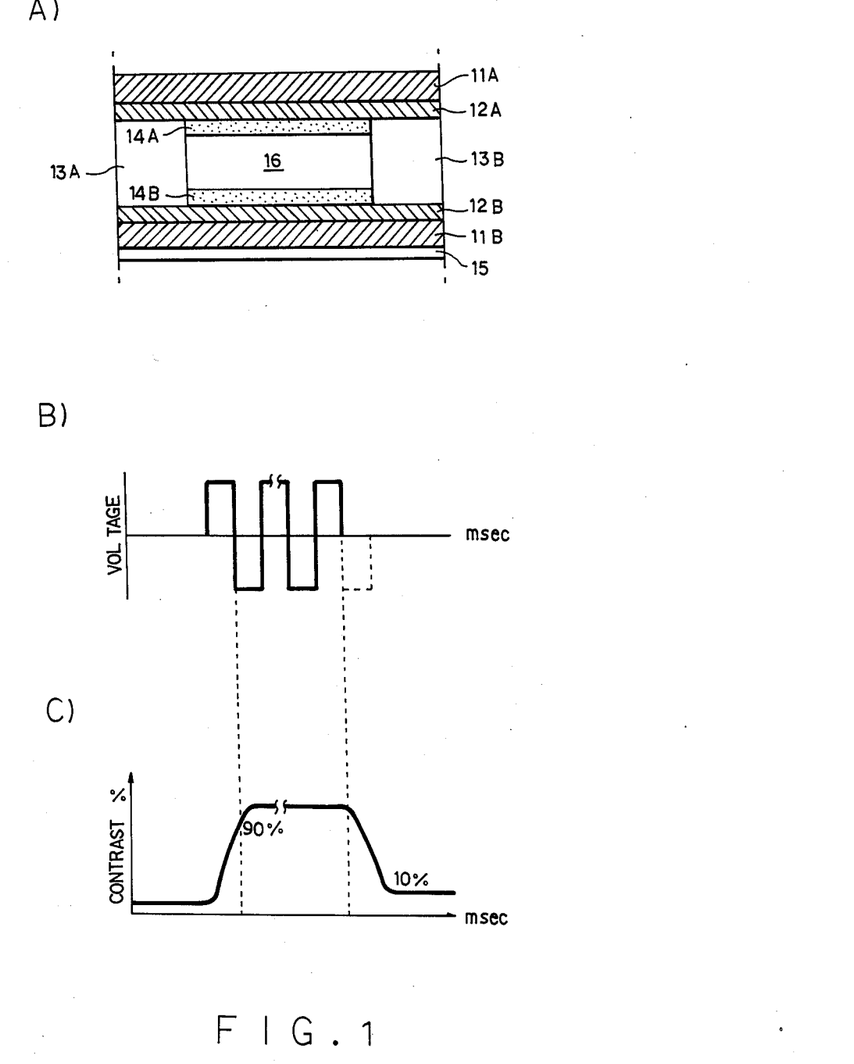

FIGS. 1(A), (B), (C) show the structure of the liquid crystal rear-vision mirror and the response characteristic curve to the voltage applied thereto, respectively. The configuration of the liquid crystal rear vision mirror comprises upper and lower transparent electrodes 12A,12B formed by evaporation on each inner surface of upper and lower glass substrate 11A,11B to apply electric field upper and lower orientation control film 14A,14B for uniformly maintaining the orientation of the liquid crystal formed on each inner side of each upper and lower transparent electrodes 12A,12B seal material 13A,13B for injecting and sealing liquid crystal material 16 between the upper and lower orientation control film 14A,14B and a reflecting film 15 for reflecting the light formed by evaporation on the lower portion of the glass substrate 11B. Upon the liquid crystal 16, GH-typed liquid crystal is used in which the guest pigment is added to a mixture of Nematic liquid crystal and Colesteric liquid crystal. Such a GH-typed compound is treated to be oriented vertically so that it is arranged parallel to upper and lower grass substrate 11A,11B to prevent the incident light from passing there through when the voltage is applied thereto. Also if liquid crystal compound is arranged vertically to the direction of the electric field during application of the electrical field, the incident light is absorbed to reduce the amount of the reflecting light. On the contrary when the voltage is not applied thereto, the incident light is reflected by the reflecting plate 15, whereby the liquid crystal compound acts as a mirror. The response characteristics of such liquid crystal 16 shows that the initial rising time(Zr) is proportional to the gap of the viscosity Ni of the liquid crystal material 16 and the square of the liquid crystal cell $d^2$, and in inverse proportion to the square of the applied voltage; and the falling time(Zf) is proportional to the viscosity Ni of the liquid crystal material and the square of the gap of the liquid crystal cell $d^2$.

It is represented as the following expressions.

$$Zr \alpha Ni \cdot d^2 / V^2 \qquad (1)$$

$$Zr \alpha Ni \cdot d^2 \qquad (2)$$

Thus to increase the response characteristics by reducing the rising time(Zr), the viscosity of the liquid crystal material should be lowered, or the cell gap of liquid crystal 16 should be made short as well as the applied voltage should be increased, but the lowering of the viscosity in the liquid crystal material is limited due to the property of the liquid crystal and the procedure for shortening the cell gap has various problems during manufacturing. Therefore it is conventional to reduce the rising time as shown in FIG. 1(C) by increasing the driving voltage of liquid crystal 16 as shown in FIG. 1(B).

Figure 2:
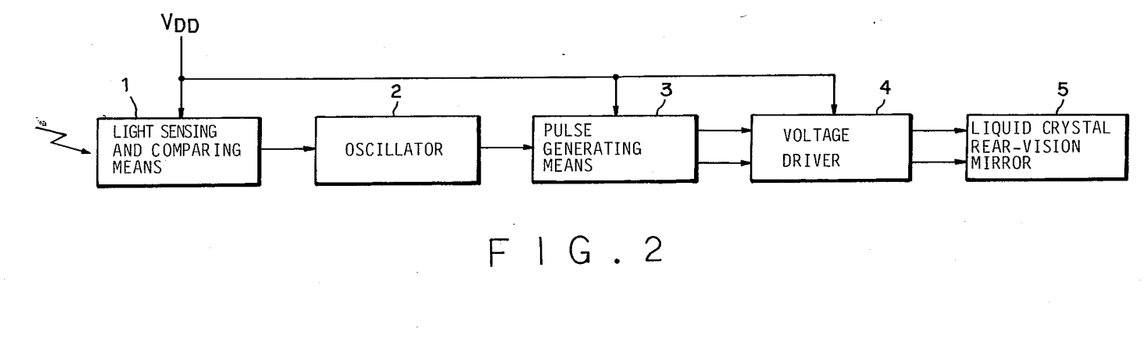
FIG. 2 is a block diagram of a control circuit for the liquid crystal rear vision-mirror according to the present invention.

FIG. 2 shows the block diagram in accordance with the present invention, the control circuit of the liquid crystal rear-vision mirror comprises light sensing and comparing means 1 for sensing the strength and weakness of the incident light, and converting it into the sensing voltage, and comparing the converted voltage with the predetermined reference level voltage, and outputting the comparing value of the amount of the incident light; oscillator 2 for receiving the comparing value of the amount of the incident light from said light sensing and comparing means 1 and oscillating/outputting a square wave having a constant period; pulse generating means 3 for receiving the square wave oscillating signal from said oscillator 2 and outputting the operating voltages at a predetermined level, the phases of which are different from each other; and voltage driver 4 for converting into the predetermined voltage level the liquid crystal operating voltages of said pulse generating means 3, the phases of which are different from each other and applying the operating voltages to liquid crystal rear-vision mirror 5.

Accordingly when the head light from the auto following behind is received at the light sensing and comparing means 1, the control circuit senses the amount of the incident light, converts it into the electric signal and the electric signal with the predetermined reference signal and outputs the comparing value of the amount of the incident light to the oscillator 2 when the incident light is larger than the predetermined reference signal. The oscillator 2 receiving the comparing value of the amount of the incident light from the light sensing and comparing means 1 begins to generate a square wave having the constant period and to output it to the pulse generating means 3. At this time the pulse generating means 3 receiving the square wave having the constant period from the oscillator 2, generates a predetermined level of the square wave having phases of which are inverted from each other, and outputs the operating voltage to the voltage driver 4. The voltage driver 4 buffers the operating voltage to a predetermined level and outputs to the upper and lower transparent electrode of liquid crystal rear-vision mirror 5. As a result, liquid crystal rear-vision mirror 5 is operated by the square wave voltage buffered and generated at the voltage driver 4 and scatteringly reflects the incident light.

Figure 3:
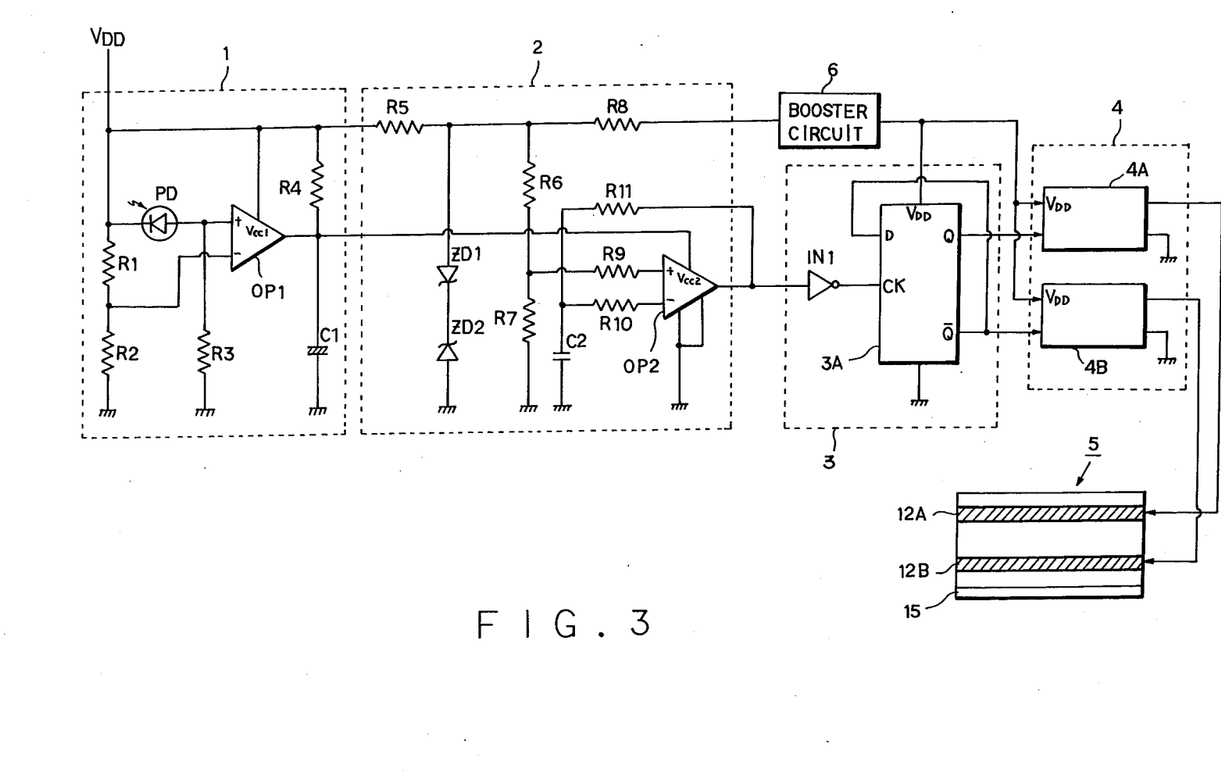
FIG. 3 is an electrical schematic diagram of a preferred embodiment of FIG. 2 according to the invention.

On the other hand, FIG. 3 shows the detailed circuit of one embodiment of the block diagram of FIG. 2. This circuit comprises the light sensing and comparing means 1, in which source voltage(VDD) of the auto is applied to the voltage divide circuit including resistor R1 and R2 connected in series and the cathode of photo diode PD having the anode connected to load resistor R3 for bypassing the dark current; the divided voltage by resistor R1 and R2 is connected to the inverting terminal(−) of comparator OP1 and the light sensing signal is inputting to the non-inverting terminal(+) of comparator OP1; such comparator OP1 compares the divided voltage with the light sensing signal, Also its output terminal has the capacitor C1 connected in series to resistor R4 one end of which is coupled to source voltage VDD. Capacitor C1 compensates for the output of comparator OP1; and the oscillator 2, in which resistor R5 is connected in parallel to resistor R4 and controls the current of the source. Zener diodes ZD1, ZD2 are coupled in series with resistor R5 in order to clamp the source voltage at the predetermined level resistors R6, R7 are connected in parallel to resistor R5 to divide the source voltage clamped/outputted by the zener diodes and by the resistor; resistor R8 drops the output voltage of resistor R5 and outputs it as the predetermined voltage, the output of resistor R8 and comparator OP1 is applied to comparator OP2 as the operating voltage, the divided voltage by resistor R6, R7 is applied through resistor R9 to the non-inverting terminal of comparator OP2, thereby outputting the predetermined signal by comparator OP2, and capacitor C2 is connected in series to resistor R10 for feeding back the output of comparator OP2, thereby discharging the voltage charged through resistor R10; and liquid crystal operating voltage generating portion 3 including latch circuit 3A receiving the output of inverter IN1 for inverting the output of comparator OP2 to use as the clock signal and also receiving the output of resistor R8 as the source voltage, thereby thereby providing a liquid crystal operating voltage exhibiting a phase change "voltage the phase of which is charged"; and the source voltage being applied to voltage driver 4 including C-MOS buffer(4A),(4B) and latch circuit 3A, and each C-MOS buffer 4A,4B receiving the operating voltage from the latch circuit 3A, the phases of which are different from each other, then buffering it at the level of the source voltage and applying the buffered output to upper and lower transparent electrodes 12A,12B of liquid crystal rear-vision mirror 5. Reference number 6 is the circuit for practicing the other process of the present invention, it is a voltage booster circuit for increasing the source voltage to the maximum applicable allowance voltage of C-MOS buffer 4A, 4B connected to resistor R5 and its output is connected to source voltage terminal VDD of C-MOS 4A, 4B.

Figure 4:
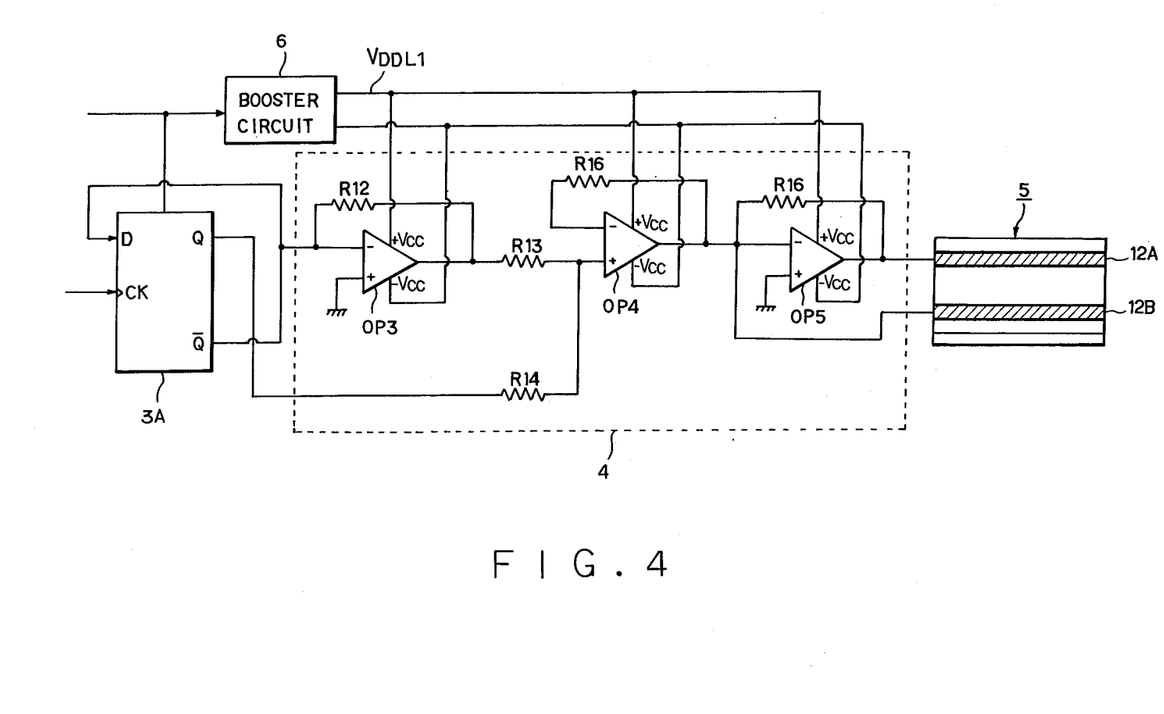
FIG. 4 is an electrical schematic diagram of another embodiment of a voltage driver.

FIG. 4 shows another embodiment of the voltage driver circuit portion of FIG. 3. Output terminal $\bar{Q}$ of latch circuit 3A is connected to the inverting terminal(−) of inverting amplifier OP3 to which feedback resister R12 is coupled while, the non-inverting terminal(+) of inverting amplifier OP3 is coupled to a reference ground. The output amplified by inverting amplifier OP3 is supplied to the non-inverting terminal(+) of adding amplifier OP4 through resistor R13. Also output of latch circuit 3A is coupled through resistor R14 to the non-inverting terminal of adding amplifier OP4. Adding amplifier OP4 has the inverting terminal(−) coupled to feedback resistor R15 and the output terminal connected to lower transparent electrode 12B of liquid crystal rear-vision mirror 5 and the inverting terminal(−) of inverting amplifier OP5. Inverting amplifier(OP5) has the inverting terminal(−) connected to feedback resistor R16 and the output coupled to upper transparent electrode 12A of liquid crystal rear-vision mirror to operate liquid crystal rear-vision mirror 5. Both of the source terminal (Vcc,−Vcc) of amplifier OP3, OP4 and OP5 receive the positive and negative voltage output of a step-up voltage circuit, namely booster circuit 6.

Figure 5:
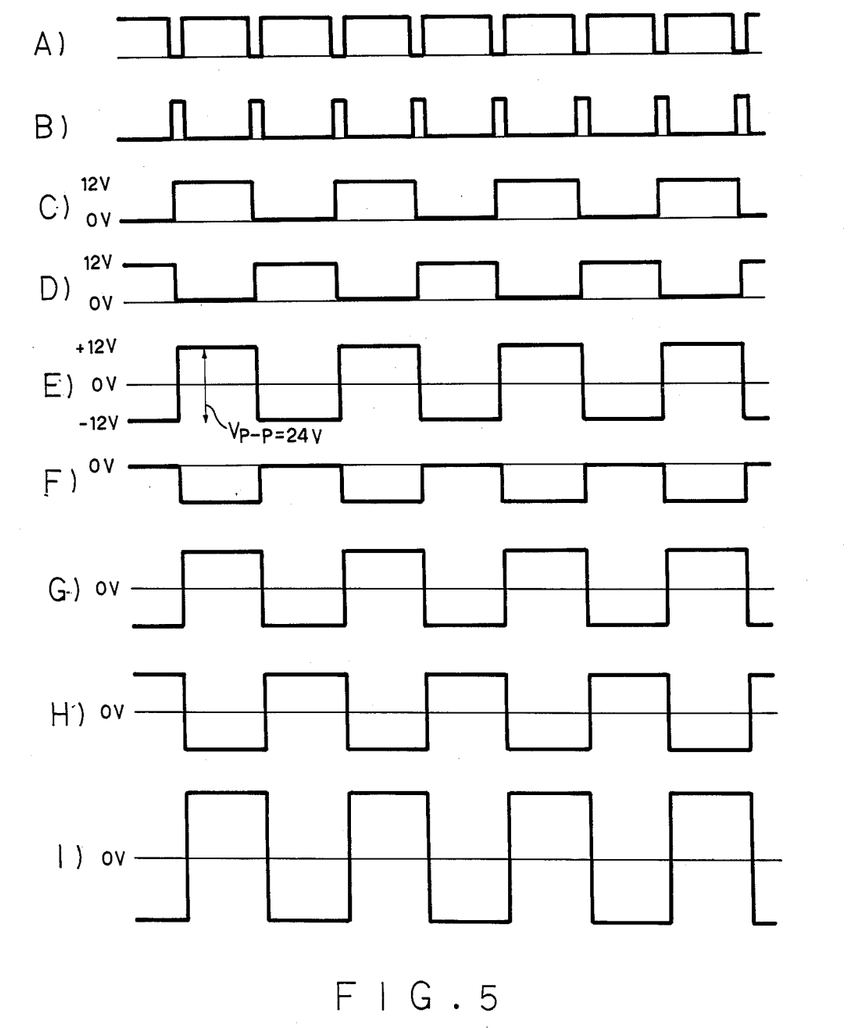
FIG. 5 are waveforms showing aspects of operation of the invention.

FIG. 5 shows the operating waveforms of each portion of FIG. 3 and FIG. 4. The waveform A is a waveform to be outputted from comparator OP2 of the oscillator. The waveform B is a wave form of inverter IN1. The waveform C,D are waveform of the liquid crystal operating voltage from latch circuit 3A. The waveform E is the operating waveform that is operated by C-MOS buffer 4A, 4B and inputted into liquid crystal rear-vision mirror 5 to operate the liquid crystal. The waveform F, G, H are outputting waveform of amplifier OP3, OP4, OP5 of FIG. 4. The waveform I is the waveform that is inputted into liquid crystal rear-vision mirror 5.

Thus the detailed explanations of a preferred embodiment in accordance with the present invention are as follows. The divided voltage of a predetermined voltage(Vcc) by resistor R1, R2 is applied to the inverting terminal of comparator OP1 which outputs the low level signal. On the other hand, source voltage VDD applied through resistor R5 is clamped by zener diode ZD1, ZD2 to be a predetermined voltage. This predetermined voltage is divided by resistor R6, R7 and applied through resistor R9 to the non-inverting terminal of comparator OP2 while the clamped voltage is connected through resistor R8 to the source terminal Vcc2 of comparator OP2. At this time the voltage applied to the source terminal Vcc2 of the comparator is clamped below the operating voltage by zener diode ZD1,ZD2 so that the comparator OP2 may not be operated.

As described above, comparator OP1 normally outputs the low level signal. But when photodiode PD receives the head light of the auto at the back, photodiode PD is turned on and converts the light into the electric signal. Thus source voltage VDD is divided by the "on" resistance of photodiode PD and resistor R3, and light amount sensing voltage Vp is applied to the non-inverting terminal(+) of comparator OP1. After photodiode PD is saturated by receiving the sufficient amount of the light, the light amount sensing voltage(Vp) divided by the "on" resistance of photodiode PD and resistor R3 is higher than the reference voltage divided by resistor R1, R2 so that comparator OP1 may output the high level signal of the source voltage VDD between resistor R4 and capacitor C1. Then the high level signal outputted from comparator OP1 is inputted to comparator OP2 along with the voltage applied through resistor R8 to the source terminal Vcc2 of compurator OP2 to operate comparator OP2. Also the non-inverting terminal(+) of comparator OP2 receives the voltage that is clamped by zener diode ZD1, ZD2 and divided by resistor R6, R7. Comparator OP2 compares it with the signal to its inverting terminal(−) and outputs the high level signal as initially shown in FIG. 5(A). Then the signal from comparator OP2 is fed back by resistor R11 and charges capacitor C2. When the charging voltage of capacitor C2 is higher than the voltage inputted to the non-inventing terminal of comparator OP2, comparator OP2 is made low at its output as shown in FIG. 5(A), thereby causing continuous oscillation. Therefore it is known that the oscillation period of comparator OP2 is determined and controlled by the time constant value RC of resistor R11 and capacitor C2. Then as comparator OP2 continues to output the waveform signal of FIG. 5(A), inverter IN1 inverts the signal of FIG. 5(A) and applies the signal of FIG. 5(B) to clock terminal CK of latch circuit 3A. Latch circuit 3A outputs from its output terminals Q, $\overline{Q}$ to C-MOS buffer 4A, 4B the square wave signals at the 12 volt level of the source voltage(VDD) respectively, the phases of which are different from each other. For example, the output terminal Q of latch circuit 3A outputs the high level signal at the rising edge of the waveform shown in FIG. 5(B) as shown in FIG. 5(C) and other output terminal $\overline{Q}$ outputs the low level signal as shown in FIG. 5(D) so that C-MOS buffers 4A, 4B receive the operating voltages having the same period but different phases. On the other hand, C-MOS buffers 4A, 4B receiving the wavefrom signals of FIG. 5(C) and FIG. 5(D) from latch circuit 3A buffers signals having the voltage level of the source voltage VDD and outputs the signals to upper and lower transparent electrodes 12A,12B of liquid crystal rear-vision mirror 5, whereby liquid crystal rear-vision mirror 5 is operated by the voltage having the square wave of FIG. 5(E) and scatters the incident light. Hereupon it is noted that C-MOS buffers 4A, 4B are used to compensate for the dropping down of the operating voltage caused by the area of the liquid crystal rear-vision mirror when the operating voltage is applied the transparent electrode 12A,12B. On the other hand, the voltage boosting circuit 6 is used as the other embodiment of the present invention, it is connected to the source line to boost the source voltage to the maximum usable voltage (for example about 18 V) and to apply the boosted voltage to operating voltage terminal VDD of C-MOS buffer 4A, 4B. Thus C-MOS buffers 4A, 4B buffer the square wave voltages having different phases as shown in FIGS. 5(C),(D) by the voltage level (about 18 V) boosted in voltage boosting circuit 6 and applies the boosted voltage to upper and lower transparent electrodes TE1, TE2 of liquid crystal rear-vision mirror 5. Therefore the peak-to-peak voltage(Vpp) applied to both ends of liquid crystal rear-vision mirror 5 becomes 36 V, or two times the operating voltage of the C-MOS buffer. Due to this, the response speed of the liquid crystal is made rapid.

Hereupon it is well known that the maximum allowable voltage of the operational amplifier or the C-MOS integrated circuit is normally about 18 volts.

FIG. 4 is another embodiment of the voltage driver when voltage boosting circuit 6 in FIG. 3 is used. Its confiquration is described as above. Thus in the case that the light sensing voltage(Vp) is higher than the reference voltage(Vref), latch circuit 3A outputs the square wave signals of FIGS. 5(C),(D) from its output terminal Q, $\overline{Q}$ so that the output of FIG. 5(D) is applied to the inverting terminal(−) of inverting amplifier OP3 and the output of FIG. (C) is inputted through resistor R14 to the non-inverting terminal of adding amplifier OP4. Inverting amplifier OP3 receiving the operating signal from output terminal $\overline{Q}$ of latch circuit 3A applies the signal of FIG. 5(F) obtained through amplifying feedback via resistor R12 to the non-inverting terminal(+) of adding amplifier OP4. Additionally non-inverting add amplifier OP4 receives at its non-inverting terminal(+) the signal from the output terminal Q of latch circuit 3A through resistor R14. The non-inverting add amplifier OP4 adds and amplifies the signal through feed-back resistor R15 and outputs the signal of FIG. 5(G) to lower transparent electrode 12B of liquid crystal rear-vision mirror 5 as well as to the inverting terminal(−) of inverting amplifier OP5. Inverting amplifier OP5 receiving the signal of FIG. 5(G) from adding amplifier OP4 at its inverting terminal(−) inverts the signal from feedback resistor R16 into the signal of FIG. 5(H) which is applied to upper transparent electrode 12A of liquid crystal rear-vision mirror 5. Then it is known that upper and lower transparent electrodes 12A,12B of liquid crystal rear-vision mirror 5 receiving the operating voltage signals as shown in FIGS. 5(G),(H) respectively is operated by the voltage of FIG. 5(F). At this time, the peak to peak voltage(Vpp) gets the C-MOS allowable operating voltage from voltage boosting circuit 6 to input to the voltage inputting terminal(Vcc), (−Vcc) of each of allowable operating OP3, OP4, OP4 to the upper limit value and the lower limit value of C-MOS operating allowance voltage. Therefore it is known that liquid crystal rear-vision mirror 5 is operated in high speed as described above in FIG. 1 by receiving the peak to peak voltage signal.

Figure 6:
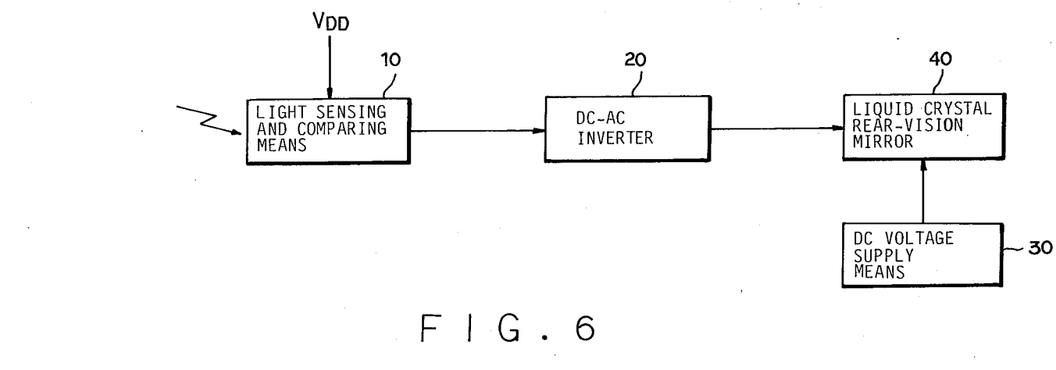
FIG. 6 is a block diagram of other embodiment of a control circuit for the liquid crystal rear-vision mirror according to the invention.

FIG. 6 shows the block diagram of the other embodiment in accordance with the present invertion. This embodiment comprises light sensing and comparing means 10 for sensing the incident light and outputting the light sensing comparision signal, DC-AC inverter 20 for receiving the light sensing comparision signal from light sensing and comparing means 10 and inverting the DC voltage into an AC signal having the constant period by the operation of the constant oscillating period as well as outputting the AC signal, DC power supply 30 for supplying the constant DC voltage and liquid crystal rear-vision mirror 40 for receiving the signal from DC-AC inverter 20 and the DC voltage signal from DC power supply 30. Thus it is known that as the headlight of the auto at the back is received at light sensing and comparing means 10, and the light sensing and comparing means 10 senses the amount of the incident light, converts it into the electric signal, compares it with the predetermined reference signal and outputs a comparing value indicating the amount of the incident light, which is a fixed DC signal, to DC-AC inverter 20 when the incident light is larger than the reference signal. DC-AC inverter 20 receiving the comparing signal of the amount of the incident light from light sensing and comparing means 10 is oscillated by a constant period to convert the DC signal into the AC signal and outputs the AC signal to the liquid crystal rear-vision mirror. At this time liquid crystal rear-vision mirror 40 receiving the AC signal of the sinusoidal wave from DC-AC inverter 20 receives a voltage from DC power supply 30 and is operated by the AC signal.

Figure 7:
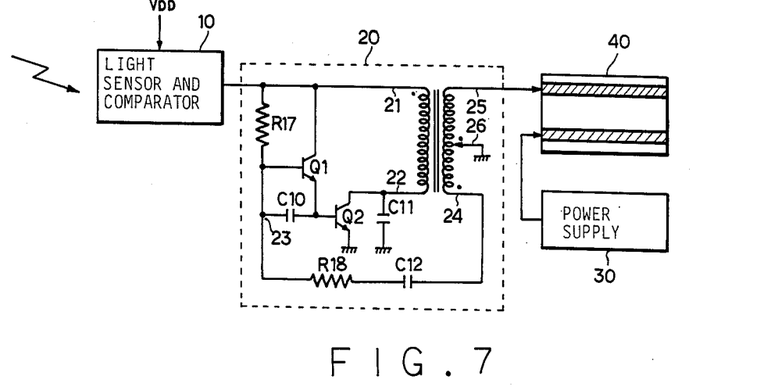
FIG. 7 is an electrical schematic diagram of the block diagram in FIG. 6.

FIG. 7 shows the detailed circuit of the embodiment of FIG. 6. The light sensing and comparing means 10 has the configuration equal to that of light sensing and comparing means 1 shown in FIG. 1. Also this embodiment comprises DC-AC inverting circuit 20, in which the DC voltage output from light sensing and comparing means 10 is applied to primary side 21 of transformer T as well as to resistor R17 and collector of switching transistor Q1 connected in parallel to each other for controlling the current induced at the secondary side. Then the voltage dropped by resistor R17 is applied to capacitor C10 for compensating for the response characteristic and the base of transistor Q1, and further is connected through resistor R18 and capacitor C12 to the secondary side 24 having the middle tap 26. Also the emitter of transistor Q1 is connected between capacitor C10 and the base of transistor Q2, and first side 22 of transformer is connected to the collector of transistor Q2 and capacitor C11 for compensating for the oscillation. DC power supply 30 for supplying the constant DC voltage is connected to liquid crystal rear-vision mirror 40 operated by the AC voltage from the output 25 of transformer T and the DC voltage of DC power supply 30.

Figure 8:
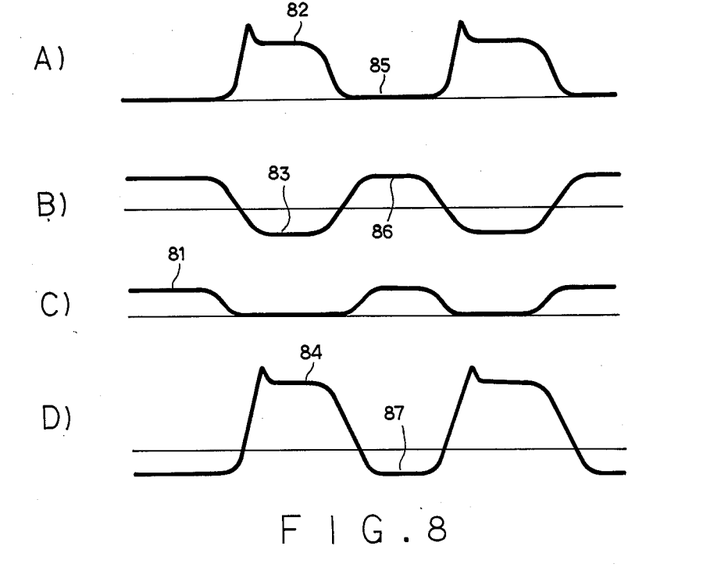
FIG. 8 are waveforms showing aspects of operation in FIG. 7.

FIG. 8 shows aspects of operation of each portion of FIG. 7. The waveform(A) is a waveform in the primary side of transformer caused by the "turn-off" of transistors Q1,Q2. The waveform B is a voltage waveform induced at the secondary side 24 of transformer T by the "turn on" and the "turn off" of transistors Q1, Q2. The waveform C is a waveform of reverse electromotive force in a point 23 by the switching operation of transistors Q1, Q2. The waveform D is the sinusoidal waveform output boosted by secondary side of transformer T.

Therefore the light sensing and comparing means 10 senses the amount of the incident light as described above with reference to FIG. 3. The source voltage(VDD) is applied to resistor R17 and the collector of transistor Q1 as well as to first side 21 of transformer T, so that the current passing through resistor R17 is inputted to the base of transistor Q1 to turn on transistor Q1 while charging capacitor C12 through resistor R18 by the time constant of RC. Therefore the "turn on" current of transistor Q1 forms a current 100 p including the primary side 21 of transformer T and transistor Q2 to which the DC voltage from the light sensing and comparing means 10 is applied. Accordingly as the capacitor C12 is charged and then discharged, the reverse electromotive force as shown in FIG. 8(C) is applied to the base of transistor Q2 and drops down the base voltage to "turn off" transistor Q2. At this time the collector voltage is made "high" like the waveform 82 shown in FIG. 8(A), whereby the voltage of the primary side is induced at the secondary side, in which the negative voltage like the waveform(83) shown in FIG. 8(B) is generated at point 24 and the voltage like the waveform(84) shown in FIG. 8(D) is generated at point 25. As the charging voltage of capacitor C12 is completely discharged, the current flowing into resistor R17 is applied through resistor R18 to capacitor C12. Capacitor C12 is again charged by the RC time constant element. Transistor Q2 is "turned on" to boost its base voltage by the current from the emitter of transistor Q1. Therefore the potential voltage of first side 22 is negative like the waveform(85) shown in FIG. 8(A), so that thus the positive voltage like the waveform(86) shown in FIG. 8(B) is induced at point 24 of the secondary side and the negative voltage like the waveform(87) shown in FIG. 8(D) is generated and outputted at point 25 of the secondary side, wherein capacitor C11 acts to eliminate the noise caused by the "turn off" of transistor Q2 and capacitor C10 acts to improve the "turn on and off" characteristics of transistors Q1, Q2. As light sensing and comparing means 10 senses the amount of the incident light and outputs the predetermined DC voltage to resistor R17, transistor Q1 and primary side 21 of transformer T, the boosted signal like the waveform of FIG. 8(D) is outputted at point 25 of the secondary side by turning on or off transistor Q2 at the interval of the RC time constant of resistor R18 and capacitor C12 and applied to upper transparent electrode 12A of liquid crystal rear-vision mirror 40. On the other hand, DC power supply 30 supplies the constant DC voltage to lower transparent electrode 12B of liquid crystal rear-vision mirror 40. Therefore liquid crystal rear-vision mirror 40 is alternately operated by the signal like the waveform of FIG. 8(D) from the secondary side of transformer T and the DC signal.

Accordingly this invention has the advantage for allowing the driver to safely drive by reducing the reflecting light directed to him. In other words, when the amount of the incident light is up to the predetermined value, this invention automatically outputs the operating voltage for liquid crystal rear-vision mirror to increased the response speed of the liquid crystal, thereby automatically operating the liquid crystal rear-vision mirror whenever the headlight of the auto at the back becomes strong.

What is claimed is:

1. A control circuit of a rear-vision mirror including a liquid crystal mirror for use in automobiles, for automatically operating the liquid crystal mirror which reduces incident light during application of a driving voltage to the liquid crystal mirror, the circuit comprising:
   light sensing and comparing means for sensing incident light on a liquid crystal mirror, providing a sensor signal representing the amount of incident light, comparing the sensor signal with a predetermined reference signal to determine strength and weakness of the incident light, and providing a comparison signal indicating the amount of the incident light;
   an Oscillator for receiving the comparison signal from said light sensing and comparing means and generating a square wave having a constant period;
   pulse generating means for receiving the square wave from said oscillator and generating a pair of operating voltage driving pulses having amplitudes determined by a source voltage and having different phases; and
   voltage driver means for buffering the driving pulses of said pulse generating means and providing the driving pulses to said liquid crystal rear-vision mirror.

2. A control circuit for a liquid crystal rear-vision mirror comprising:
   light sensing and comparing means for sensing light incident on a liquid crystal mirror, providing a sensor signal representing the amount of incident light, comparing the sensor signal with a reference signal to determine strength and weakness of the incident light, and providing a comparison signal indicating the amount of the incident light;
   DC-AC inverting means for receiving the comparison signal from said light sensing and comparing means, for oscillating by a predetermined period to convert a DC signal into an AC signal and output the AC signal in sinusoidal waveform to an upper transparent electrode of the liquid crystal rear-vision mirror; and
   a DC power supply for supplying a predetermined DC voltage signal to a lower transparent electrode of the liquid crystal rear-vision mirror whereby the liquid crystal rear-vision mirror is alternately operated by the signals applied to both the upper and lower transparent electrodes.

3. The control circuit of claim 1, further comprised of:
   a boosting circuit for providing a boosted voltage by increasing amplitude of the source voltage to the maximum allowable voltage of a C-MOS integrated circuit and for applying the boosted voltage to said voltage driver means; and
   said voltage driver means including C-MOS integrated circuit means coupled to receive said driving pulses, for applying said driving pulses to said liquid crystal mirror of amplitudes of said boosted voltage.

4. The circuit of claim 1, further comprised of:
   a boosting circuit for providing boosted voltages of opposite polarity by increasing the amplitude of the source voltage to a maximum allowable voltage of an operational amplifier and for applying the boosted voltages to said voltage driver means;
   said voltage driver means including:
   a first inverting stage including a first operational amplifier coupled to receive said boosted voltages, said first operational amplifier having an inverting terminal coupled to receive a first one of said driving pulses from said pulse generating means and an output terminal providing an amplified output;
   a non-inverting stage including a second operational amplifier coupled to receive said boosted voltages, said second operational amplifier having a non-inverting terminal coupled to receive both a second one of said driving pulses from said pulse generating means and said amplified output, and an output terminal connectable to a first electrode of the liquid crystal mirror; and
   a second inverting stage including a third operational amplifier coupled to receive said boosted voltages, said third operational amplifier having an inverting terminal coupled to said output terminal of said second operational amplifier and having an output terminal connectable to a second electrode of the third crystal mirror.

5. The control circuit of claim 2, wherein said inverting means comprises:
   a transformer having a primary winding and a secondary winding, said primary winding having a first terminal coupled to receive said comparison signal and said secondary winding being coupled to provide said sinusoidal waveform to the upper transparent electrode;
   means coupled to a second terminal of said primary winding, for compensating for oscillations of electrical variables in said primary winding;
   switching means coupled across said first terminal of said primary winding and said compensating means, for controlling current induced into said secondary winding; and
   impedance means coupled between said switching means and secondary winding, for establishing a time constant for said oscillations.

6. A control circuit for a liquid crystal mirror, comprising:
   light sensing and comparing means for sensing light incident on a liquid crystal mirror, for providing a sensor signal representing the amount of incident light, for comparing the sensor signal with a predetermined reference signal to determine strength of the incident light, and for providing a comparison signal indicating the strength of the incident light; and
   means arranged to receive said comparison signal from said light sensing and comparing means, for generating and alternately applying to a first of two oppositely disposed electrodes of the liquid crystal mirror a first driving pulse exhibiting a constant period, an amplitude and a first phase, and to a second driving pulse exhibiting said constant period and a second phase different from said first phase.

7. The control circuit of claim 6, wherein said generating means comprises:

oscillating means receiving the comparison signal for generating an alternating waveform of constant period;

pulse generating means receiving the alternating waveform, for generating a pair of intermediate pulses having amplitudes determined by a source voltage and having different phases;

boosting means for providing boosted voltages by increasing amplitude of the source voltage to a predetermined allowable voltage; and voltage driving means coupled to receive said boosted voltages, for buffering and for applying the intermediate pulses to said first and second electrodes as said first and second driving pulses exhibiting an amplitude equal to said predetermined allowable voltage.

8. The control circuit of claim 7, wherein said voltage driving means comprises a C-MOS integrated circuit coupled to receive said pair of intermediate pulses and apply said first and second driving pulses to said first and second electrodes.

9. The control circuit of claim 7, wherein said voltage driving means comprises:

a first inverting stage including a first operational amplifier coupled to receive said boosted voltages, said first operational amplifier having an inverting terminal coupled to receive a first one of said intermediate pulses from said pulses generating means and an output terminal providing an amplified output;

a non-inverting stage including a second operational amplifier coupled to receive said boosted voltages, said second operational amplifier having a non-inverting terminal coupled to receive both a second one of said intermediate pulses from said pulse generating means and said amplified output, and an output terminal connectable to the first electrode of the liquid crystal mirror; and a second inverting stage including a third operational amplifier coupled to receive said boosted voltages, said third operational amplifier having an inverting terminal coupled to said output terminal of said second operational amplifier and having an output terminal connectable to the second electrode of the liquid crystal mirror.

10. The control circuit of claim 6, wherein said generating means compromises:

DC-AC inverting means for receiving the comparison signal from said light sensing and comparing means, for converting said comparison signal into an AC waveform exhibiting predetermined period, and for applying said AC waveform as said first driving pulse to said first electrode; and DC power supply means for supplying a DC voltage signal as said second driving pulse to said second electrode;

whereby the liquid crystal mirror is alternately operable by application of said first and second ones of said driving pulses to corresponding ones of said first and second electrodes.

11. The control circuit of claim 10, wherein said inverting means comprises:

a transformer having a primary winding and a secondary winding, said primary winding having coupled to receive said comparison signal and said secondary winding being coupled to provide said sinusoidal waveform to the upper transparent electrode;

means coupled to a second terminal of said primary winding, for compensating for oscillations of electrical variables in said primary winding;

switching means coupled across said first terminal of said primary winding and said compensating means, for controlling current induced into said secondary winding; and impedance means coupled between said switching means and secondary winding, for establishing a time constant for said oscillations.

* * * * *